No. 806,418. PATENTED DEC. 5, 1905.
L. D. LOVEKIN.
CLAMPING MECHANISM FOR PIPE FLANGING MACHINES.
APPLICATION FILED SEPT. 2, 1904.

3 SHEETS—SHEET 3.

Attest
P. M. Kelly
Wm. Rooney

Inventor
Luther D. Lovekin
By his atty

UNITED STATES PATENT OFFICE.

LUTHER D. LOVEKIN, OF PHILADELPHIA, PENNSYLVANIA.

CLAMPING MECHANISM FOR PIPE-FLANGING MACHINES.

No. 806,418. Specification of Letters Patent. Patented Dec. 5, 1905.

Application filed September 2, 1904. Serial No. 223,080.

*To all whom it may concern:*

Be it known that I, LUTHER D. LOVEKIN, of the city and county of Philadelphia, State of Pennsylvania, have invented an Improvement in Clamping Mechanism for Pipe-Flanging Machines, of which the following is a specification.

My invention has reference to clamping mechanism for pipe-flanging machines; and it consists of certain improvements which are fully set forth in the following specification and shown in the accompanying drawings, which form a part thereof.

More specifically my invention relates to the clamping devices for holding the pipe and flange of a pipe-flanging machine of the character set out in my application, Serial No. 203,272, filed April 15, 1904. In machines of this class, where pipes of large diameters are to be flanged, enormous strains are required to be sustained by the flange and pipe and flange clamping and supporting devices, and where the flange is not adequately supported it is liable to crack, expand, or become distorted, either of which defects prevent a tight joint being made with the expanded pipe.

The object of my invention is to provide a pipe and flange supporting and clamping structure which shall so sustain the flange and pipe that the latter may be expanded under the greatest force necessary without permitting the flange to spring, crack, or become distorted, thereby insuring a perfect joint between the pipe and flange, and these results accomplished in the cold.

In carrying out my invention I provide a housing having a flanged opening and adapted to be rigidly secured to the bed-frame of the expanding and flanging machine and combine therewith a bushing fitting the flanged opening of the housing and having a central flanged opening shaped to accurately receive and fit the pipe-flange into which the pipe is to be expanded.

My invention also consists in providing means for clamping the pipe-flange in the bushing and in having means for clamping the pipe itself to hold it against rotating during the expanding operation.

An essential feature of my improvement is in having the bushing and housing of such strength that it exceeds the resisting limit necessary to prevent the pipe-flange expanding during the expansion of the pipe.

My invention also comprehends details of construction which, together with the features above specified, will be better understood by reference to the drawings, in which—

Figure 1:
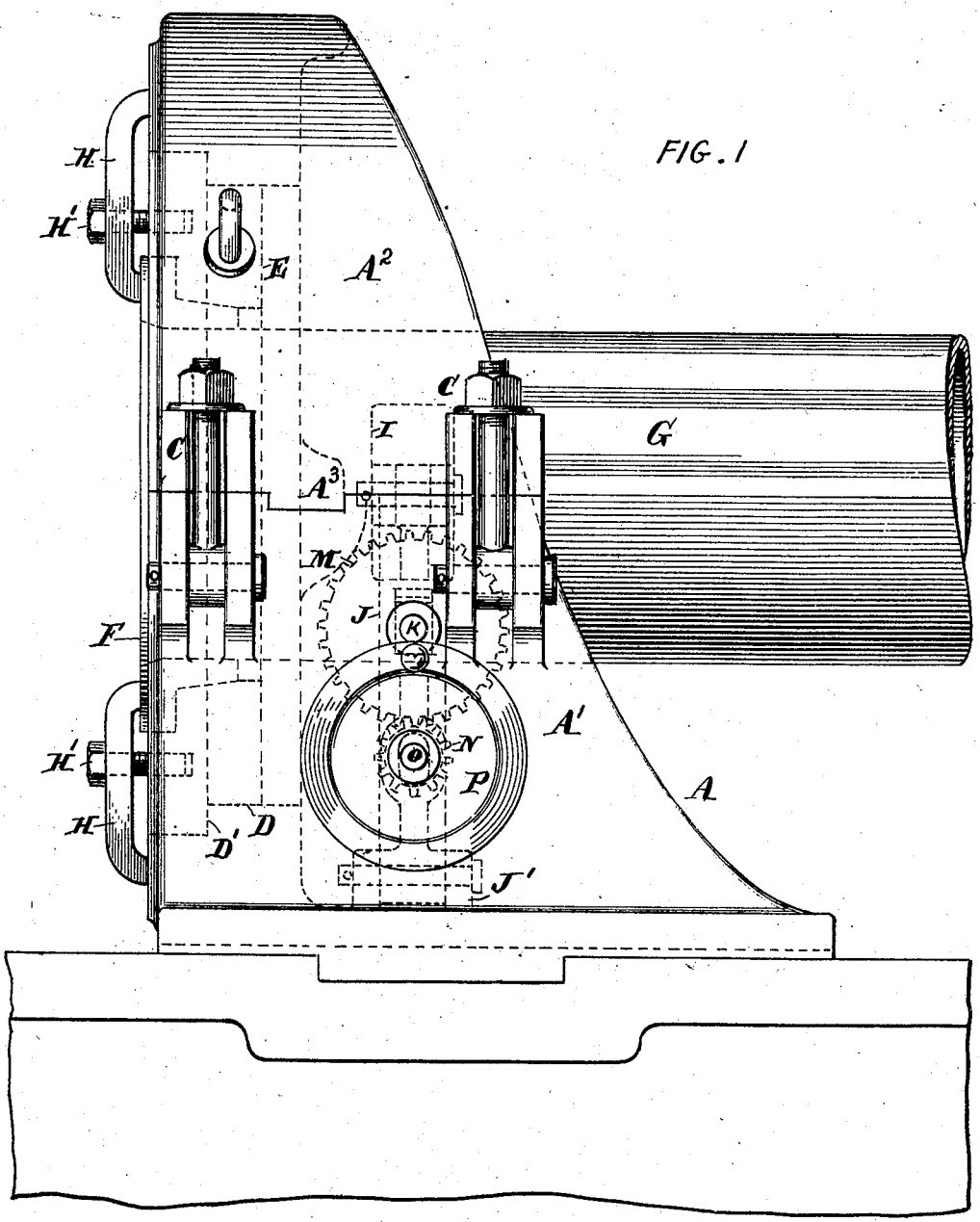
Figure 2:
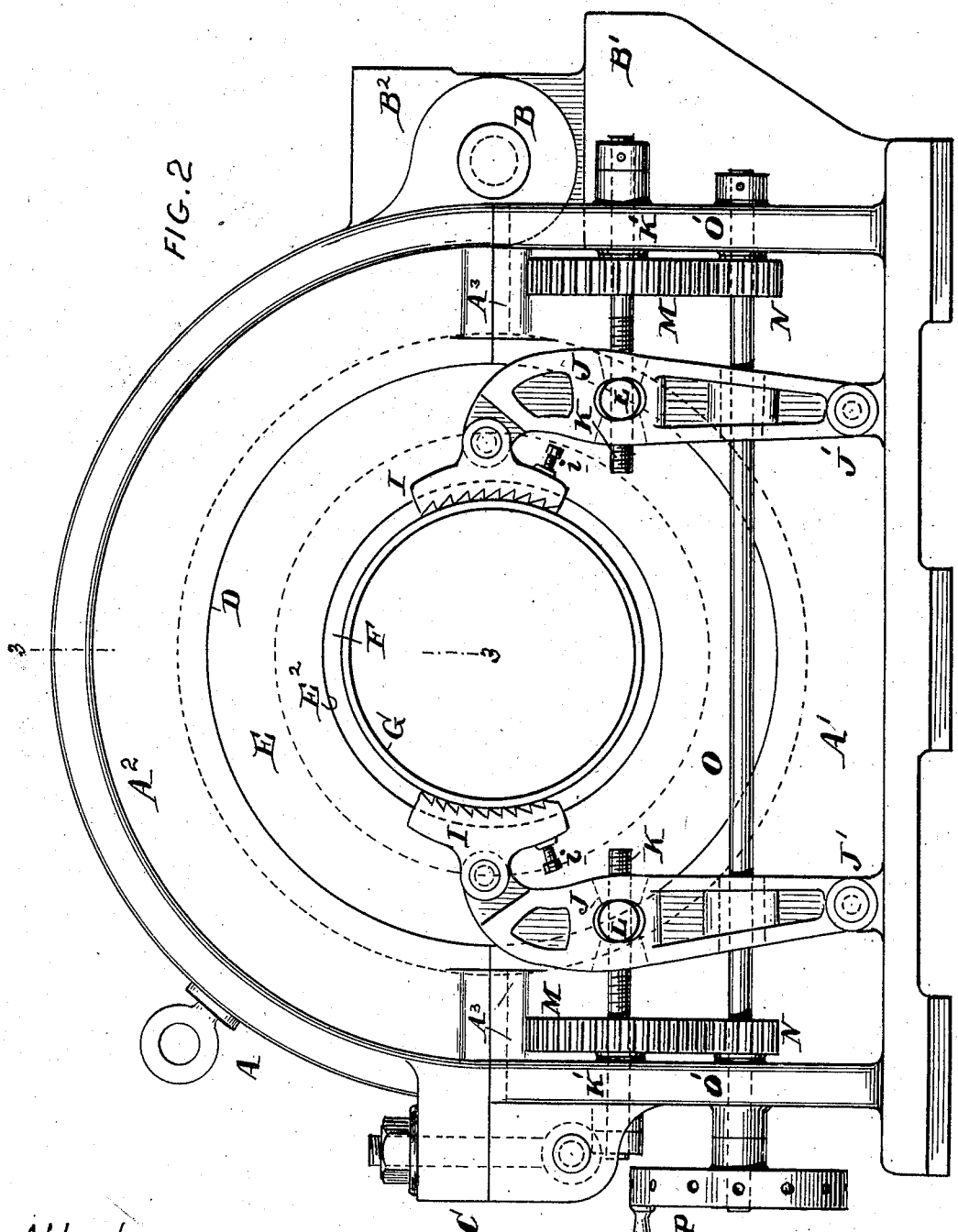
Figure 3:
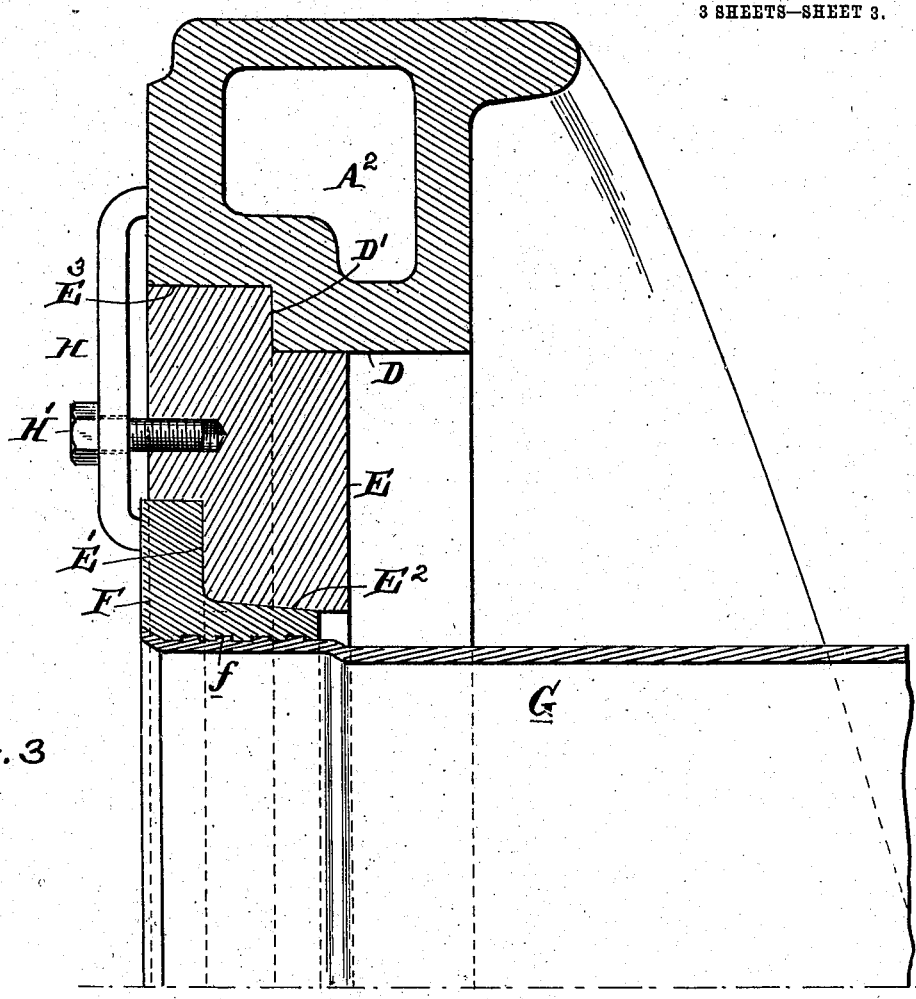
Figure 4:
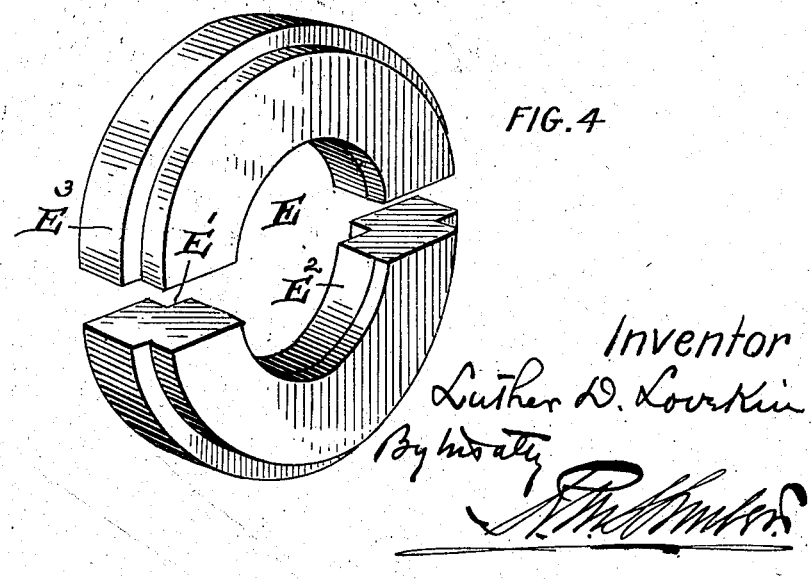

Figure 1 is a side elevation of my improved pipe and flange clamping and supporting mechanism. Fig. 2 is a rear elevation of same. Fig. 3 is a vertical section of same on line 3 3 of Fig. 2, and Fig. 4 is an elevation of one of the bushings removed and in split form.

A is the housing, and consists of the base portion A' and the top portion $A^2$. These parts are separated on a horizontal plane through the axis of the pipe and are hinged together on one side by hinge B and are clamped together at the other side by clamps C. When the clamps C are undone, the top part $A^2$ of the housing may be turned back on its hinge, and the ribs $B^2$ thereof rest upon the ribs B' on the base to sustain the said part $A^2$ in an upright position. When the two parts of the housing are clamped together, they form an opening D, having a flange or shoulder D', and the opening is preferably turned so as to be accurate in shape. Fitted within the opening D of the housing is the bushing E, which has a diameter to fit the opening and is provided with a flange $E^3$ to fit the flange D' of the housing, so that the bushing may at no place in its circumference lack proper support by the housing. The inner part of the bushing is also turned with the flange E' and the inclined aperture $E^2$ to fit the pipe-flange F accurately. The pipe-flange is held in the bushing by the clamps H, which bridge the bushing and have their ends respectively resting on the housing and pipe-flange. These clamps are held in place by clamping-screws H, which are screwed into the bushing E.

G is the pipe, and is shown in expanded condition. In the case of flanges of large diameters the inner surface may be turned with grooves $f$ and the metal of the expanded pipe forced into said grooves, as indicated in Fig. 3. In this construction there is less tendency for the pipe to be forced out of the flange in use.

It will be observed that the flange fits tightly the bushing E and in turn the bushing fits tightly the housing, so that the great strain of expanding the pipe is transmitted to the housing. The space of the flanged opening in the bushing will vary to suit the shape of the pipe-flange employed.

If desired, the bushing E may be a ring structure in one piece, but may be divided, as shown in Fig. 4, if preferred, so as to be easily removed from the pipe. In cases where both ends of the pipe are required to be fitted with flanges it is essential to use a divided or split bushing. When the bushing is split, the line of division should be arranged horizontally, so that the two parts of the bushing may be clamped together when clamping down the top part $A^2$ of the housing. This bushing is replaceable by bushings of the same external diameter, but having the flanged openings of different diameters to suit pipe of various diameters, and it is only necessary to substitute any of a series of bushings to suit the particular diameter and shape of pipe-flange in which the pipe is to be expanded. In the same way the clamps H are replaced by longer ones to reach to the flanges of smaller diameter.

Referring now to the gripping devices for holding the pipe G from rotating, I provide two grips I I, having curved gripping-surfaces and furnished with teeth, the direction of the teeth on one jaw being opposite to those on the other jaw, so as to hold the pipe from opposite sides and resist its tendency to rotate. These jaws are pivoted to upright arms J, hinged at J' to the base of the housing. Adjustable stops $i$ are provided on the jaws to limit their extent of oscillation and hold them in gripping position when the arms J are thrown back. These arms J are moved toward and from each other by screws K K, one of which is right and the other left handed. These screws are journaled in bearings K' in the housing and connect with the arms J by means of transverse pins L, the ends of which extend loosely through holes $l$ in the arms and through which pins the screws K work. The screws K K are respectively provided with spur-gears M M, which mesh with pinions N N on a transverse shaft O, journaled in bearings O' in the housing. This shaft O is also provided with a hand-wheel P, by which to rotate it. By turning the hand-wheel the jaws may be moved toward or from each other to grip or release the pipe, as required. Any other mechanism for operating the jaws may be employed in lieu of that shown, if so desired.

While I have shown the housing in two parts hinged together, it is evident that they may be connected in any other suitable way.

By employing a housing and bushing of the character herein set out embodying such mass of metal and accurate fitting between the housing, bushing, and pipe-flange the resistance to expansion of the latter is so great that breakage and distortion is eliminated, and consequently power sufficient may be applied to the expansion of the pipe G to displace the metal in the cold state so as to roll the pipe thinner within the pipe-flange than at the body of the pipe, thereby lengthening the pipe and filling the grooves $f$ of the flange F, as clearly shown in Fig. 3. This insures an extremely strong joint.

While I prefer the construction shown as being excellently adapted to the commercial use of my invention, I do not confine myself to the details thereof, as they may be modified without departing from the spirit of the invention.

Having now described my invention, what I claim as new, and desire to secure by Letters Patent, is—

1. In a machine for expanding and flanging pipe, a clamp for the pipe-flange consisting of a housing having a flanged opening, combined with a removable bushing flanged both on its outer and inner edges the outer flanged edge closely fitting the interior surface of the flanged opening of the housing and the inner flanged edge closely fitting the pipe-flange, whereby the outward expansion on the pipe-flange is resisted by the housing wholly through the periphery of the bushing and the end thrust on the pipe-flange is resisted by the flanges of the bushing and housing.

2. In a machine for expanding and flanging pipe, a clamp for the pipe-flange consisting of a housing having a flanged opening, combined with a removable bushing made in sections so as to be removable from the pipe and flange when removed from the housing and flanged both on its outer and inner edges the outer flanged edge closely fitting the interior surface of the flanged opening of the housing and the inner flanged edge closely fitting the pipe-flange, whereby the outward expansion on the pipe-flange is resisted by the housing wholly through the periphery of the bushing and the end thrust on the pipe-flange is resisted by the flanges of the bushing and housing.

3. In a machine for expanding and flanging pipe, a clamp for the pipe-flange consisting of a housing having a flanged opening and made in divided form so as to facilitate the removal of the pipe when operation is completed, clamping means for clamping the two parts of the housing together, combined with a removable bushing flanged both on its outer and inner edges the outer flanged edge closely fitting the interior surface of the flanged opening of the housing and the inner flanged edge closely fitting the pipe-flange and adapted to be clamped in the housing, whereby the outward expansion on the pipe and flange is resisted by the housing wholly through the periphery of the bushing and the end thrust on the pipe-flange is resisted by the flanges of the bushing and housing.

4. In a machine for expanding and flanging pipe, a clamp for the pipe-flange consisting of a housing having a flanged opening and made in divided form so as to facilitate the removal of the pipe when the operation is completed, clamping means for clamping the two parts of the housing together, combined with a removable bushing made in sections so as to be removable from the pipe and flange when removed from the housing and flanged both on its outer and inner edges the outer flanged edge closely fitting the inner surface of the flanged opening of the housing and the inner flanged edge closely fitting the pipe-flange and adapted to be clamped in the housing, whereby the outward expansion on the pipe-flange is resisted by the housing wholly through the periphery of the bushing and the end thrust on the pipe-flange is resisted by the flanges of the bushing and housing.

5. In a machine for expanding and flanging pipe, a clamp for the pipe-flange consisting of a housing having a large opening greatly exceeding the diameter of the pipe to be expanded, combined with a removable bushing located wholly within the opening in the housing and flanged both on its entire outer and inner edges the outer peripheral edge being adapted to fit the opening in the housing and the inner edge being adapted to fit the pipe-flange and the strength of said bushing and housing being greatly in excess of the expansion or bursting resistance of the pipe and flange.

6. In a machine for expanding and flanging pipe, a clamp for the pipe-flange consisting of a housing having a large opening greatly exceeding the diameter of the pipe to be expanded, combined with a removable bushing flanged both on its outer and inner edges the outer edge being adapted to fit the opening in the housing and the inner edge being adapted to fit the pipe-flange and the strength of said bushing and housing being greatly in excess of the expansion or bursting resistance of the pipe and flange, and clamps extending from the housing inward to press upon the pipe-flange to hold it in position within the bushing.

7. In a machine for expanding and flanging pipe, a clamp for the pipe-flange consisting of a housing having a large opening greatly exceeding the diameter of the pipe to be expanded, combined with a removable bushing flanged both on its outer and inner edges the outer edge being adapted to fit the opening in the housing and the inner edge being adapted to fit the pipe-flange and the strength of said bushing and housing being greatly in excess of the expansion or bursting resistance of the pipe and flange, and clamps extending from the housing inward to press upon the pipe-flange to hold it in position within the bushing and having clamping-screws extending through the clamps and into the bushing.

8. In a machine for expanding and flanging pipe, a clamp for the pipe-flange consisting of a housing having an opening and divided so as to facilitate the removal of pipe after being expanded, means for clamping the divided portions of the housing together, and a removable bushing fitting within the housing and directly held by it against outward thrust and having its inner edge flanged to closely fit the pipe-flange.

9. In a machine for expanding and flanging pipe, a clamp for the pipe-flange consisting of a housing having an opening and divided so as to facilitate the removal of the pipe after being expanded into the flange, means for clamping the divided portions of the housing together, a bushing fitting within the housing and held by it and having its inner edge flanged to closely fit the pipe-flange, and means to clamp the pipe-flange within the bushing.

10. In a machine for expanding and flanging pipe, a clamp for the pipe-flange consisting of a housing having an opening and divided so as to facilitate the removal of the pipe after being expanded into the flange, means for clamping the divided portions of the housing together, a bushing fitting within the housing and held by it and having its inner edge flanged to closely fit the pipe-flange, and gripping devices for gripping the pipe and holding it against rotation.

11. In a machine for expanding and flanging pipe, a clamp for the pipe-flange consisting of a housing having an opening and divided so as to facilitate the removal of the pipe after being expanded into the flange, means for clamping the divided portions of the housing together, a bushing fitting within the housing and held by it and having its inner edge flanged to closely fit the pipe-flange, gripping devices for gripping the pipe and holding it against rotation, and means carried by the housing for adjusting the gripping devices nearer together to grip the pipe.

12. In a machine for expanding and flanging pipe, a clamp for the pipe-flange consisting of a housing having a large opening greatly exceeding the diameter of the pipe to be expanded, combined with a removable bushing flanged both on its outer and inner edges the outer edge being adapted to fit the opening in the housing and the inner edge being adapted to fit the pipe-flange and the strength of said bushing and housing being greatly in excess of the expansion or bursting resistance of the pipe and flange, and gripping devices for holding the pipe against rotation consisting of two oppositely-directed toothed jaws, screws for moving said jaws to or from each other, and hand-operated means for simultaneously operating said screws.

13. In a machine for expanding and flanging pipe, a clamp for the pipe-flange consisting of a housing having a large opening greatly exceeding the diameter of the pipe to be expanded, combined with a removable bushing flanged both on its outer and inner edges the outer edge being adapted to fit the opening in the housing and the inner edge being adapted to fit the pipe-flange and the strength of said bushing and housing being greatly in excess of the expansion or bursting resistance of the pipe and flange, and gripping devices for holding the pipe against rotation consisting of two oppositely-directed toothed jaws, pivoted arms each hinged at one end to the housing and at the other end to one of the jaws, screws operating upon the pivoted arms for moving said jaws to or from each other, and hand-operated means carried by the housing for simultaneously operating said screws.

14. In a machine for expanding and flanging pipe, a clamp for the pipe-flange consisting of a housing provided with an opening, combined with a removable bushing located within the housing and closely fitting the opening in the said housing so as to transmit all outward strain directly to the interior wall of the opening in the housing and having its inner edge flanged to closely fit the pipe-flange and directly receive the expansive strain put upon the pipe and flange the strength of the bushing and housing being greatly in excess of expansive thrust put upon the pipe and flange in the act of expanding and flanging the pipe therein.

15. In a machine for expanding and flanging pipe, a clamp for the pipe-flange consisting of a housing provided with an opening having an inwardly-directed flange and made in two parts so as to be capable of being separated for removal of the pipe, in combination with a bushing flanged upon its outer surface to fit the interior of the opening of the housing and having its external diameter an exact counterpart of the internal opening in the housing whereby the two parts fit accurately in contact throughout the circumference of the bushing and in which the bushing is provided with a central aperture flanged to accurately fit a pipe-flange whereby the latter may be located within the housing and the outward strains be positively transmitted through the bushing and directly to the interior surface of the aperture of the housing.

In testimony of which invention I have hereunto set my hand.

LUTHER D. LOVEKIN.

Witnesses:
M. J. EYRE,
R. M. KELLY.